United States Patent
Peck et al.

(10) Patent No.: US 10,152,050 B2
(45) Date of Patent: Dec. 11, 2018

(54) APPARATUS AND METHOD FOR SIMULATING A FAILURE RESPONSE IN AN ELECTROMECHANICAL ACTUATOR

(71) Applicant: The Boeing Company, Chicago, IL (US)

(72) Inventors: Jim L. Peck, Huntington Beach, CA (US); Jeffrey C. Coffman, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 15/061,225

(22) Filed: Mar. 4, 2016

(65) Prior Publication Data

US 2017/0255190 A1    Sep. 7, 2017

(51) Int. Cl.
*G05B 23/02* (2006.01)

(52) U.S. Cl.
CPC ..... *G05B 23/0243* (2013.01); *G05B 23/0208* (2013.01)

(58) Field of Classification Search
CPC ................................. G05B 23/0243
See application file for complete search history.

(56) References Cited

U.S. PATENT DOCUMENTS

| | | | |
|---|---|---|---|
| 4,578,993 A | 4/1986 | Burandt | |
| 5,805,797 A * | 9/1998 | Sato | B61L 3/008 714/48 |
| 5,837,879 A * | 11/1998 | Zick | H02P 1/12 73/1.37 |
| 6,012,541 A * | 1/2000 | Nishioka | B62D 5/06 180/404 |
| 6,546,782 B1 * | 4/2003 | De La Cruz | G01N 3/56 73/10 |
| 6,640,196 B1 * | 10/2003 | Unsworth | G01R 31/343 702/115 |
| 2008/0154470 A1 * | 6/2008 | Goranson | B60T 7/042 701/70 |
| 2009/0108129 A1 | 4/2009 | Flatt | |
| 2010/0049403 A1 * | 2/2010 | Gillman | B62D 5/0406 701/43 |
| 2011/0118924 A1 * | 5/2011 | Nasu | B60L 15/2045 701/22 |
| 2015/0108281 A1 | 4/2015 | Antraygue | |

FOREIGN PATENT DOCUMENTS

| | | |
|---|---|---|
| CN | 202928797 U * | 5/2013 |
| DE | 10 2007 034466 | 1/2008 |

OTHER PUBLICATIONS

CN202928797U English Machine Translation.*
European Patent Office, Extended European Search Report, EP 17 15 8539 (dated Jul. 4, 2017).

* cited by examiner

*Primary Examiner* — Khamdan Alrobaie
(74) *Attorney, Agent, or Firm* — Walters & Wasylyna LLC (57) ABSTRACT

A control system may include a fault detection system, an electromechanical actuator, the electromechanical actuator electronically coupled to the fault detection system, and a failure simulation apparatus mechanically coupled between the electromechanical actuator and a load, the failure simulation apparatus selectively applies an external resistive force to the electromechanical actuator.

20 Claims, 5 Drawing Sheets

APPARATUS AND METHOD FOR SIMULATING A FAILURE RESPONSE IN AN ELECTROMECHANICAL ACTUATOR

FIELD

The present disclosure is generally related to fault detection in a system under control and, more particularly, to apparatus and methods for simulating a failure response in an electromechanical actuator in order to register a fault in the control system.

BACKGROUND

A control system may include a controller connected to a system under control. As one example, the system under control may be a mechanical or electrical system. Fault detection in a control system may be performed by periodically or continuously monitoring a command signal from the controller and one or more output signals from the system under control, and comparing the output signals to a threshold limit to determine if there is a fault in the system. However, it may be difficult to select an appropriate threshold limit that balances maximization of fault detection with minimizing false fault detections. It may further be difficult to generate output signals that accurately represent a failure response in the system in order to select the threshold limit.

In one particular example, a fault detection system may monitor command signals to the system and output signals provided by the system to detect faults in the system. In order to verify performance of the fault detection system, a fault in the system must be generated. One way to generate a fault in the system is to physically modify the system to create output signals that represent a failure response. However, physical modifications may be time consuming and costly. Further, physical modifications may permanently damage the system. Another way to generate a fault in the system is to use a computer model to simulate output signals that represent a failure response. However, simulations merely provide predicted output signals based on a given failure response and not what the actual output signal would be.

Accordingly, those skilled in the art continue with research and development efforts in the field of generating failure responses in systems under control.

SUMMARY

In one example, the disclosed control system may include a fault detection system, an electromechanical actuator, the electromechanical actuator electronically coupled to the fault detection system, and a failure simulation apparatus mechanically coupled between the electromechanical actuator and a load, the failure simulation apparatus selectively applies an external resistive force to the electromechanical actuator.

In another example, the disclosed failure simulation apparatus may include a linkage including a longitudinal axis, a first end configured to be mechanically coupled to an electromechanical actuator, and a longitudinally opposed second end configured to be mechanically coupled to a load, a caliper to apply a resistive force to the linkage, and a conduit, the linkage being linearly movable through the conduit in response to linear movement of the electromechanical actuator.

In yet another example, the disclosed method for simulating a failure response in an electromechanical actuator may include the steps of: (1) positioning a linkage through a linkage channel of a conduit, (2) coupling a first end of the linkage to an output of an electromechanical actuator, (3) coupling a second end of the linkage to a load, (4) applying a resistive force to the linkage by a caliper, (4) actuating linear motion of the output of the electromechanical actuator, and (5) resisting linear movement of the linkage with the resistive force applied by the caliper to alter an output response of the electromechanical actuator.

Other examples of the disclosed system, apparatus, and method will become apparent from the following detailed description, the accompanying drawings and the appended claims.

DETAILED DESCRIPTION

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Figure 1:
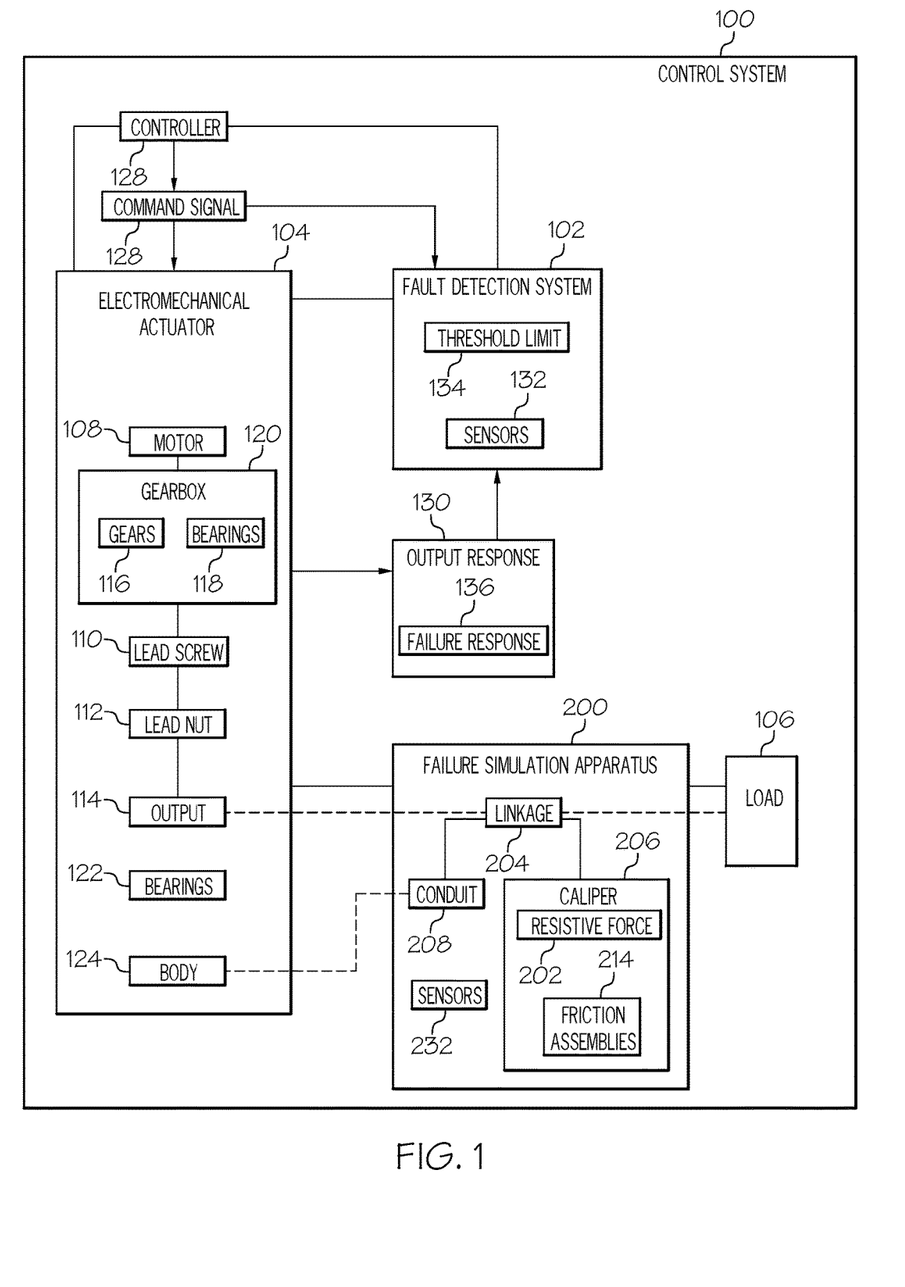
FIG. 1 is a schematic perspective view of one example of the disclosed control system.
Figure 7:
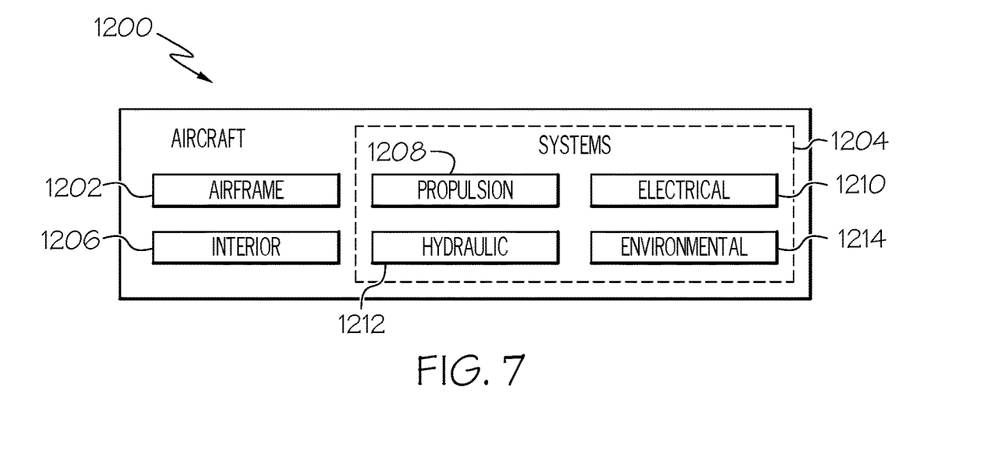
FIG. 7 is a schematic illustration of an aircraft.

In FIGS. 1 and 7, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 7 may be combined in various ways without the need to include other features described in FIGS. 1 and 7, other drawing figures, and/or the accompanying disclosure, even though such combination or combinations are not explicitly illustrated herein. Similarly, additional features not limited to the examples presented, may be combined with some or all of the features shown and described herein.

Figure 5:
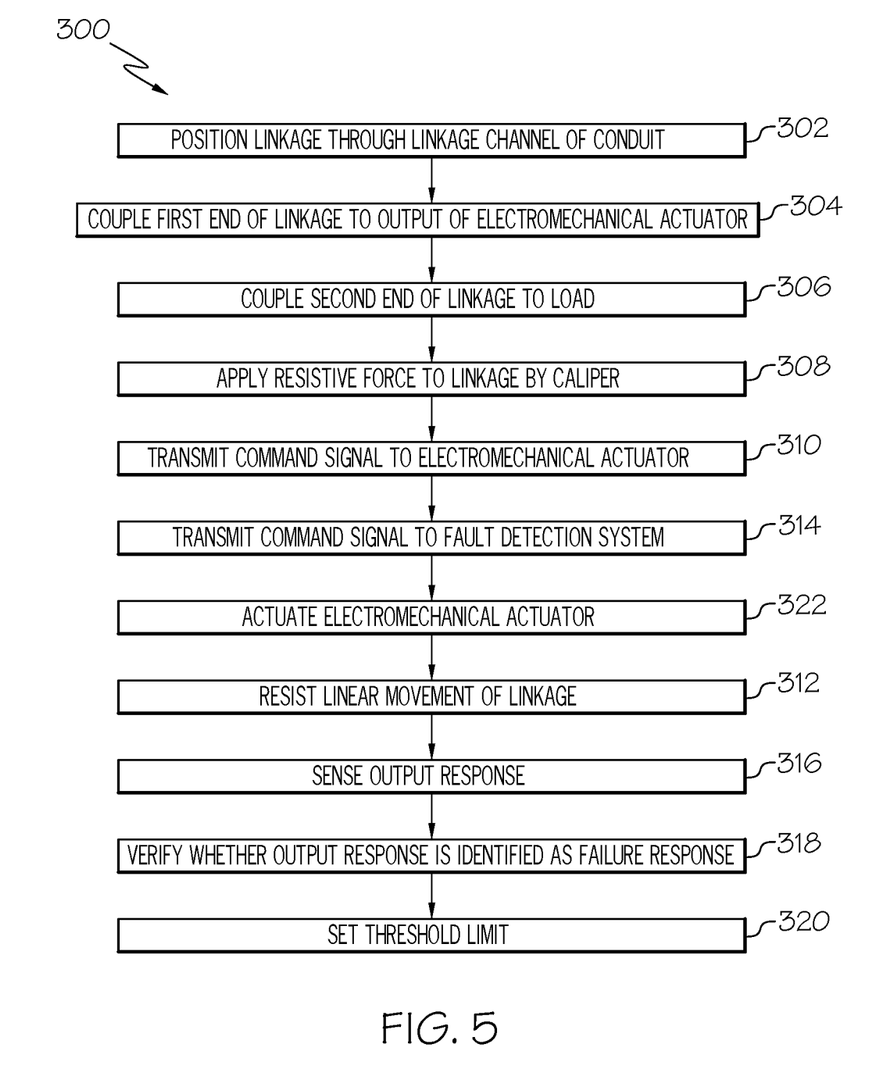
FIG. 5 is a flow diagram of one example of the disclosed method for simulating a failure response in an electromechanical actuator.
Figure 6:
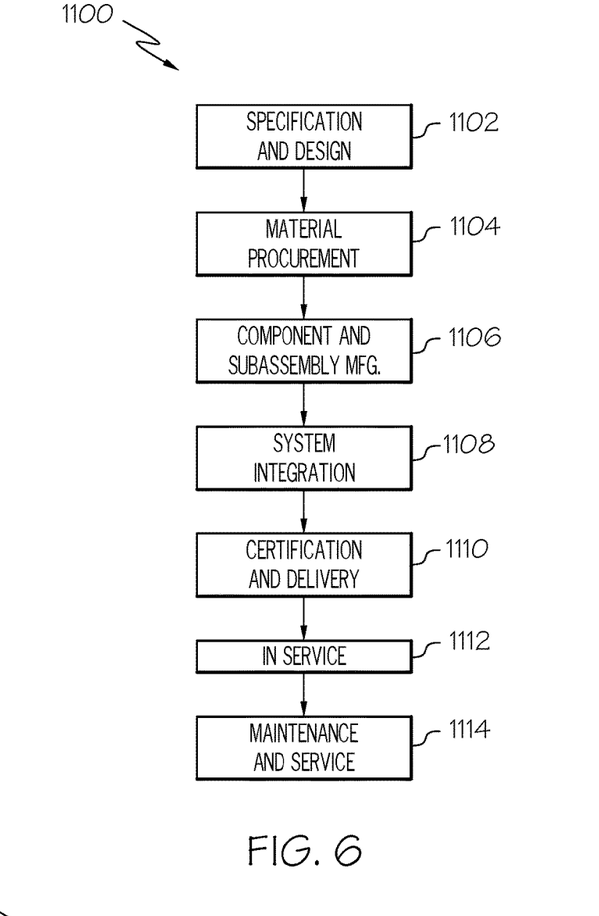
FIG. 6 is a block diagram of aircraft production and service methodology.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Referring to FIG. 1, one example of control system, generally referred to herein as system 100, is disclosed. Control system 100 includes fault detection system 102, electromechanical actuator 104 electronically coupled to fault detection system 102, and failure simulation apparatus, generally referred to herein as apparatus 200, mechanically coupled between electromechanical actuator 104 and load 106. Failure simulation apparatus 200 selectively applies external resistive force 202 to electromechanical actuator 104.

In one example, electromechanical actuator 104 includes electric motor 108 mechanically connected to lead screw 110. Rotary motion of motor 108 rotates lead screw 110. Lead nut 112 is threadably connected to lead screw 110 and interlocked with a non-rotating output 114 (e.g., piston) of electromechanical actuator 104. Rotary motion of motor 108 is converted to linear displacement of output 114 by driving lead nut 112 along lead screw 110. The direction of motion of lead nut 112 and, thus, the linear motion of output 114, depends on the direction of rotation of lead screw 110. Motor 108 may be connected to lead screw 110 directly or through gearbox 120 including a series of gears 116 (e.g., pinion gears, worm gears, idler gears, etc.) and/or bearings 118 (e.g., angular contact ball bearings). Body 124 of electromechanical actuator 104 may also include bearings 122 (e.g., linear bearings, bushings, etc.) to provide smooth linear motion of output 114. During normal operation of electromechanical actuator 104, output 114 may be mechanically coupled to load 106.

In one example, system 100 includes controller 126 electrically coupled to electromechanical actuator 104, for example, by a wiring harness. Electromechanical actuator 104 may be controlled by controller 126. Controller 126 may generate a command, which may be converted to command signal 128 (also referred to as a control signal). As examples, command signal 128 may include a specific voltage or current configured to control electromechanical actuator 104. Controller 126 may include a processor and instructions configured to be executed by the processor. Controller 126 may include hardware, software, or a combination of hardware and software.

In one example, command signal 128 may cause electromechanical actuator 104 to carry out the command contained in command signal 128, for example, in the form of output response 130. As one example, output response 130 may include a specific force generated by electromechanical actuator 104, a rate of motion of output 114 of electromechanical actuator 104, a torque generated by electromechanical actuator 104, and the like.

In one example, command signal 128 may be provided as input to fault detection system 102. As one example, fault detection system 102 may be electrically coupled to controller 126, for example, by a wiring harness. Output response 130 may be provided as input to fault detection system 102. As one example, fault detection system 102 may be electrically coupled to electromechanical actuator 104 to acquire output response 130. As one example, fault detection system 102 may include one or more sensors 132 configured to measure output response 130. Fault detection system 102 may include a processor and instructions configured to be executed by the processor. Fault detection system 102 may include hardware, software, or a combination of hardware and software. While fault detection system 102 is illustrated by example as a separate element of control system 100, in other examples, fault detection system 102 may be located in (e.g., as part of) controller 126.

In one example, fault detection system 102 may compare output response 130 to threshold limit 134 in order to determine or identify failure response 136 from electromechanical actuator 104. As one example, failure response 136 may represent a fault in system 100. As used herein, failure response 136 refers to any output response 130 that is outside of a predetermined operational value or range of values corresponding to electromechanical actuator 104.

Therefore, threshold limit 134 may represent the predetermined operational range of a particular electromechanical actuator 104.

Over time and in response to normal operational conditions or extreme conditions, internal wear or other damage may lead to failure response 136 in electromechanical actuator 104. As one example, an increase in internal friction within the mechanical chain between motor 108, gearbox 120, and/or lead screw 110 of electromechanical actuator 104 may cause failure response 136. As specific, non-limiting examples, the increase in internal friction may be due to the threads on the lead screw and/or the lead nut wearing down, gears and/or bearings wearing down, gears losing teeth, contacts between gears wearing down, the spacing between contact surfaces of gears, the lead screw, and/or the lead nut increasing, the motor failing, binding of the mechanical chain between the motor and the lead screw, free play in the mechanical chain between the motor and the lead screw, and the like.

Thus, fault detection system 102 may be utilized to monitor the health of electromechanical actuator 104, verify the performance of electromechanical actuator 104, and/or manage the service life of electromechanical actuator 104. Prior to installation of fault detection system 102 or during the service life of fault detection system 102, it may be necessary to train fault detection system 102 to recognize failure response 136 by electromechanical actuator 104 (e.g., faults in system 100), evaluate the performance of fault detection system 102 in detecting failure response 136 by electromechanical actuator 104, and/or verify the accuracy of fault detection system 102 in detecting failure response 136 by electromechanical actuator 104. The disclosed apparatus 200 may be used to simulate an increase in internal friction of electromechanical actuator 104 and, thus, producing failure response 136.

Figure 2:
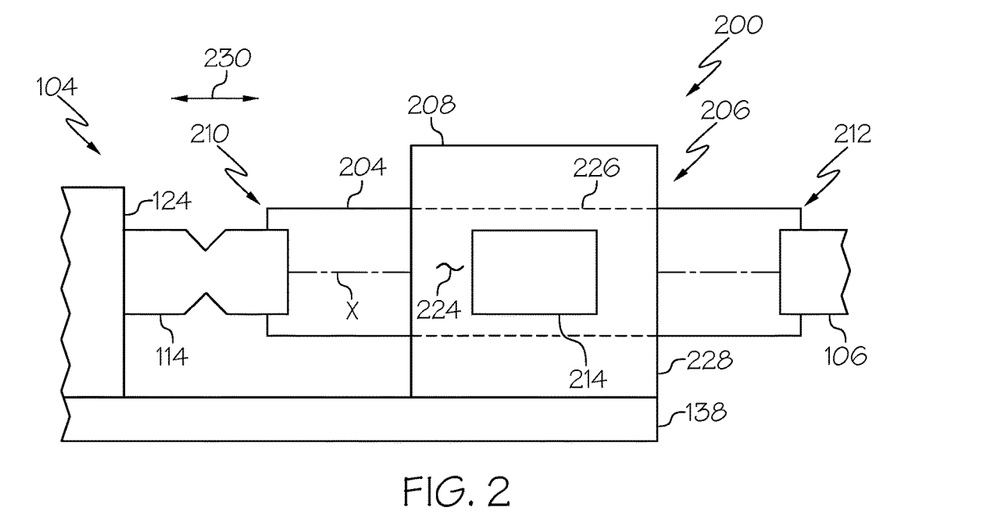
FIG. 2 is a schematic side elevation view of one example of the disclosed failure simulation apparatus of FIG. 1.
Figure 3:
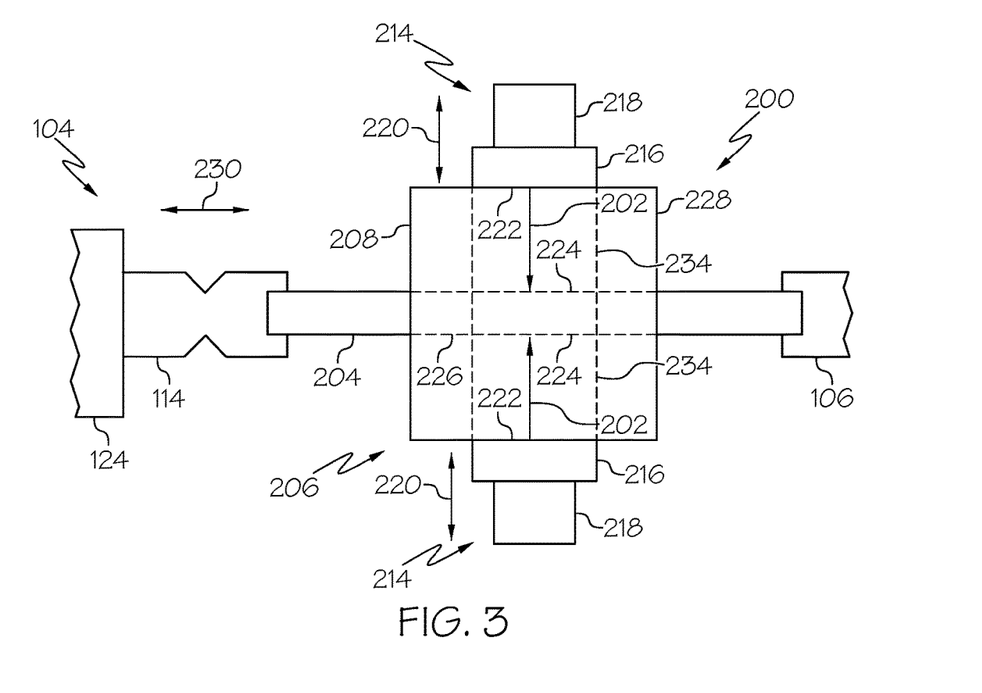
FIG. 3 is a schematic top plan view of the failure simulation apparatus of FIG. 2 in a first position.

Referring to FIGS. 2 and 3, and with reference to FIG. 1, in one example, apparatus 200 includes linkage 204, caliper 206, and conduit 208. Linkage 204 may include longitudinal axis X (FIG. 2), first end 210 (FIG. 2) mechanically coupled to electromechanical actuator 104 (e.g., output 114 of electromechanical actuator 104), and a longitudinally opposed second end 212 (FIG. 2) mechanically coupled to load 106. Caliper 206 may apply resistive force 202 to linkage 204. Linkage 204 may be linearly movable through conduit 208. Linkage 204 may be connected in series with the mechanical load path and provide a rigid coupling between the linearly movable output 114 of electromechanical actuator 104 and load 106.

Resistive force 202 applied to linkage 204 simulates an increase in friction within electromechanical actuator 104. Thus, from the perspective of electromechanical actuator 104, resistive force 202 applied to linkage 204 by caliper 206 makes electromechanical actuator 104 perform like there is an increase in friction or some other internal mechanical problem within electromechanical actuator 104. In other words, when resistive force 202 is applied to linkage 204, a particular command signal 128 provided to electromechanical actuator 104 will not result in a proper output response 130 (i.e., will result in failure response 136).

In one example, caliper 206 may be a clamp configured to apply a measured or controlled resistive force 202 to linkage 204. Resistive force 202 may be variable (e.g., a variable force) based on a measured or controlled pressure applied to linkage 204 by caliper 206. As one example, each one of friction assemblies 214 may apply a predetermined resistive force 202 on contact surfaces 224 of linkage 204. As examples, a variable or controlled resistive force 202 applied to linkage 204 by caliper 206 may reduce the force generated by electromechanical actuator 104, reduce the rate of motion of output 114 of electromechanical actuator 104, reduce the torque generated by electromechanical actuator 104, or otherwise generate output response 130 that should be identified by fault detection system 102 as failure response 136 (e.g., outside the range of threshold limit 134).

Referring to FIG. 1, in one example, apparatus 200 may include one or more sensors 232 (e.g., pressure sensors) configured to detect the amount of pressure (e.g., resistive force 202) applied to linkage 204 (e.g., contact surfaces 224) by caliper 206 (e.g., friction assemblies 214).

Thus, in one example, resistive force 202 applied to linkage 204 may be specifically selected and controlled to represent a particular type of internal failure of electromechanical actuator 104 in order to generate a particular output response 130 outside of threshold limit 134 (e.g., failure response 136).

Referring to FIGS. 2 and 3, and with reference to FIG. 1, in one example, caliper 206 may include or house a laterally opposed pair of friction assemblies 214. Each one of the pair of friction assemblies 214 (also referred to herein as friction assembly 214) may engage linkage 204 to apply resistive force 202. In one example, resistive force 202 applied by each friction assembly 214 is equal.

Figure 4:
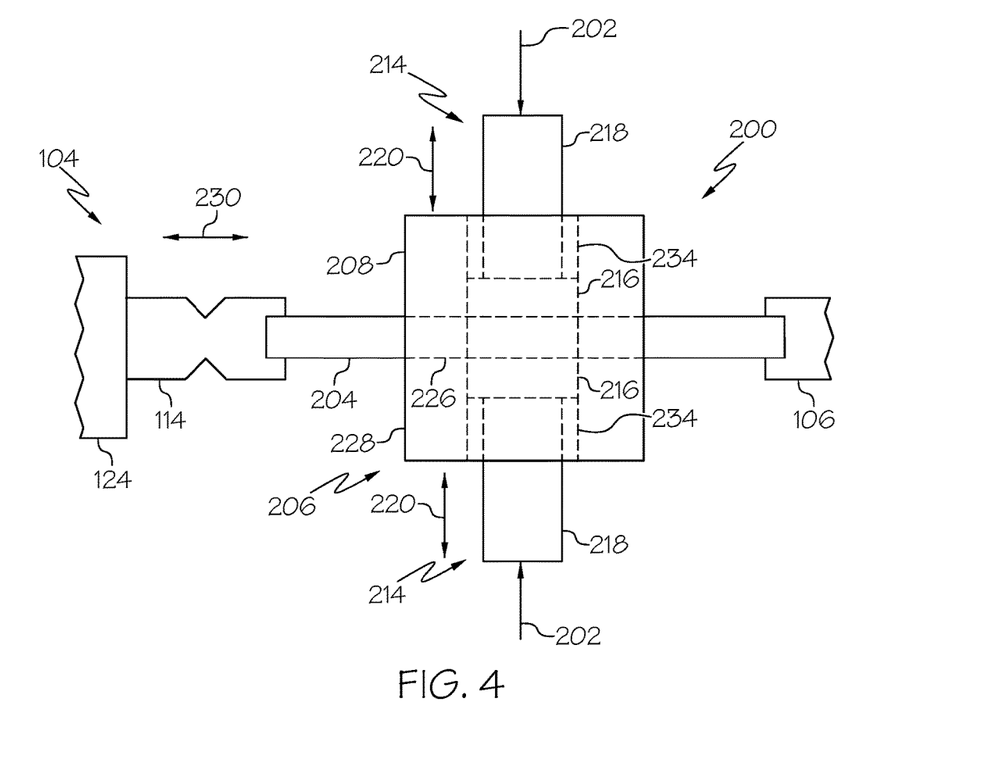
FIG. 4 is a schematic top plan view of the failure simulation apparatus of FIG. 2 in a second position.

Referring to FIGS. 3 and 4, in one example, each friction assembly 214 may include friction pad 216 and actuator 218 coupled to friction pad 216. Actuator 218 may selectively move friction pad 216 between a first position not in contact with linkage 204, as illustrated in FIG. 3, and a second position in contact with linkage 204, as illustrated in FIG. 4. As one example, actuator 218 may move friction pad 216 linearly in the directions of arrow 220. Actuator 218 may be any suitable linear actuator capable of moving friction pad 216 into contact with linkage 204 to apply resistive force 202 to linkage 204. As non-limiting examples, actuator 218 may include a mechanical actuator, an electromechanical actuator, a hydraulic actuator, a pneumatic actuator, and the like.

As one example, friction pad 216 may include non-metallic materials, such as materials made from a combination of various synthetic substances bonded into a composite, for example, in the form of cellulose, aramid, polyacrylonitrile ("PAN", sintered glass, and the like. As another example, friction pad 216 may include semi-metallic materials, such as synthetic materials mixed with some proportion of flaked metals. As another example, friction pad 216 may include fully metallic materials. As another example, friction pad 216 may include ceramic materials, such as clay and porcelain bonded to copper flakes and filaments.

Friction pad 216 may include friction surface 222 (FIG. 3). As one example, friction surface 222 may be a smooth surface. For example, friction surface 222 may be a generally flat surface free from projections or unevenness. As another example, friction surface 222 may be a rough surface. For example, friction surface 222 may be a course or uneven surface having projections, irregularities, or breaks (e.g., a knurled surface).

Referring to FIGS. 2 and 3, linkage 204 may include laterally opposed contact surfaces 224. In one example, linkage 204 may include a first one of contact surfaces 224 associated with and contacted by a first one of friction assemblies 214 (e.g., a first one of friction pads 216) and a laterally opposed second one of contact surfaces 224 associated with and contacted by a second one of friction assemblies 214 (e.g., a second one of friction pads 216). As one example, one or both of contact surfaces 224 may be a smooth surface. For example, contact surfaces 224 may be a generally flat surface free from projections or unevenness. As another example, contact surfaces 224 may be a rough surface. For example, one or both of contact surfaces 224 may be a course or uneven surface having projections, grooves, irregularities, or breaks.

Referring to FIGS. 2-4, conduit 208 includes body 228. As one example, body 228 may be a block structure configured to support linkage 204. In one example, body 228 of conduit 208 may include linkage channel 226 extending completely therethrough. Linkage 204 may be disposed within, extend outwardly from, and move linearly, for example, in the directions of arrow 230, though linkage channel 226. Conduit 208 may limit movement of linkage 204 to linear movement and prevent any bending or rotation of linkage 204 in response to actuation (e.g., linear movement) of electromechanical actuator 104, for example, in the directions of arrow 230.

Referring to FIGS. 3 and 4, and with reference to FIG. 1, the positions of electromechanical actuator 104 and conduit 208 may be fixed relative to each other. In one example, conduit 208 and electromechanical actuator 104 may be rigidly interconnected by coupling 138. As one example, body 228 of conduit 208 may be directly coupled to body 124 of electromechanical actuator 104, for example, by coupling 138. As another example, body 228 of conduit 208 may be indirectly coupled to body 124 of electromechanical actuator 104, for example, through coupling 138. For example, both conduit 208 and electromechanical actuator 104 may be fixedly connected to the same support surface.

Referring to FIGS. 2-4, in one example, body 228 of conduit 208 may include friction assembly channel 234 extending therethrough. Friction assembly channel 234 may be positioned approximately perpendicular relative to and intersect linkage channel 226. Friction assemblies 214 may move linearly, for example, in the directions of arrows 220, through friction assembly channel 234. As one example, the first one of friction assemblies 214 (e.g., the first one of friction pads 216) may move linearly within a corresponding first one or first portion of friction assembly channel 234 such that the first one of friction pads 216 may contact the first one of contact surfaces 224 of linkage 204 to apply resistive force 202. Similarly, the second one of friction assemblies 214 (e.g., the second one of friction pads 216) may move linearly within a corresponding second one or second portion of friction assembly channel 234 such that the second one of friction pads 216 may contact the second one of contact surfaces 224 of linkage 204 to apply resistive force 202.

Referring to FIG. 5, and with reference to FIGS. 1-4, one example of method 300 is disclosed. Method 300 is one example implementation of a method for simulating a failure response in an electromechanical actuator, for example, to verify performance of a fault detection system. Modifications, additions, or omissions may be made to method 300 without departing from the scope of the present disclosure. Method 300 may include more, fewer, or other steps. Additionally, steps may be performed in any suitable order.

In one example, method 300 may include the step of providing control system 100 including controller 126, fault detection system 102, electromechanical actuator 104, and failure simulation apparatus 200.

In one example, method 300 may include the step of positioning linkage 204 through linkage channel 226 of conduit 208, as shown at block 302. Method 300 may include the step of coupling first end 210 of linkage 204 to output 114 of electromechanical actuator 104, as shown at block 304. Method 300 may include the step of coupling second end 212 of linkage 204 to load 106, as shown at block 306. Method 300 may include the step of applying resistive force 202 to linkage 204 by caliper 206, as shown at block 308. Method 300 may include the step of actuating linear motion of output 114 of electromechanical actuator 104, as shown at block 322. Method 300 may include the step of resisting linear movement of linkage 204 with resistive force 202 applied by caliper 206 to alter output response 130 of electromechanical actuator 104, as shown at block 312.

In one example, method 300 may include the step of transmitting command signal 128 to electromechanical actuator 104 to actuate linear motion of output 114 of electromechanical actuator 104, as shown at block 310. Method 300 may include the step of transmitting command signal 128 to fault detection system 102, as shown at block 314. Method 300 may include the step of sensing output response 130 by fault detection system 102, as shown at block 316. Method 300 may include the step of verifying whether output response 130 is identified as failure response 136 by fault detection system 102, as shown at block 318.

In one example, method 300 may include the step of setting threshold limit 134 based on failure response 136, as shown at block 320.

Generally, the disclosed system 100 may be utilized with any mobile platform or stationary platform having at least one electromechanical actuator used to drive a load and a fault detection system used to monitor the health or lifespan of the electromechanical actuator. Similarly, the disclosed apparatus 200 and method 300 may be utilized with the mobile platform or the stationary platform to simulate a failure response in the electromechanical actuator in order to evaluate the performance or verify the accuracy of the fault detection system. In one specific, non-limiting example, the disclosed system 100 may be utilized with or represent a system of an air vehicle, such as an aircraft, a spacecraft, a missile, a rocket, a satellite, and the like. As one example, an aircraft may include a plurality of electromechanical actuators 104 coupled to various different loads 106. As specific, non-limiting examples, load 106 may include landing gear, ailerons, flaps, slats, rudders, and the like. As specific, non-limiting examples, fault detection system 102 may include a prognostic health management ("PHM") system or software, an integrated vehicle health management ("IVHM") system or software, and the like. In other specific, non-limiting examples, the disclosed system 100 may be utilized with or represent a system of a land vehicle, a marine vehicle, a construction vehicle, and the like.

Accordingly, the disclosed apparatus 200 and method 300 provide an effective and cost efficient way to simulate a failure response in an electromechanical actuator, for example, to train and/or test a fault detection system without physically modifying or damaging the internal components of the electromechanical actuator.

Examples of system, apparatus and method disclosed herein may be described in the context of aircraft manufacturing and service method 1100 as shown in FIG. 6 and aircraft 1200 as shown in FIG. 7.

During pre-production, the illustrative method 1100 may include specification and design, as shown at block 1102, of aircraft 1200, which may include design of control system 100 (FIG. 1), and material procurement, as shown at block 1104. During production, component and subassembly manufacturing, as shown at block 1106, and system integration, as shown at block 1108, of aircraft 1200 may take place. Training and/or testing fault detection system 102 by simulating failure response 136 in electromechanical actuator 104 using apparatus 200 as described herein may be accomplished as a portion of the production, component and subassembly manufacturing step (block 1106) and/or as a portion of the system integration (block 1108). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200. Testing fault detection system 102 by simulating failure response 136 in electromechanical actuator 104 using apparatus 200 may also be formed as a portion of routine maintenance and service (block 1114).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 1200 produced by illustrative method 1100 may include control system 100, as described with respect to FIG. 1, and a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while aircraft 1200 is in service (block 1112) and during maintenance and service stage (block 1114).

Although various examples of the disclosed system, apparatus, and method have been shown and described, modifications may occur to those skilled in the art upon reading the specification. The present application includes such modifications and is limited only by the scope of the claims.

What is claimed is:

1. A control system comprising:
a fault detection system;
an electromechanical actuator, said electromechanical actuator electronically coupled to said fault detection system; and
a failure simulation apparatus mechanically coupled between said electromechanical actuator and a load, said failure simulation apparatus selectively applies an external resistive force to said electromechanical actuator.

2. The system of claim 1 wherein said failure simulation apparatus comprises:
a linkage comprising a longitudinal axis, a first end mechanically coupled to said electromechanical actuator, and a longitudinally opposed second end mechanically coupled to a load;
a caliper to apply a resistive force to said linkage; and
a conduit, said linkage being linearly movable through said conduit.

3. The system of claim 2 wherein said resistive force applied to said linkage simulates an increase in friction within said electromechanical actuator.

4. The system of claim 2 wherein said caliper comprises a laterally opposed pair of friction assemblies, and wherein each one of said pair of friction assemblies engages said linkage to apply said resistive force.

5. The system of claim 4 wherein each one of said pair of friction assemblies comprises a friction pad and an actuator coupled to said friction pad, and wherein said actuator selectively moves said friction pad between a first position not in contact with said linkage and a second position in contact with said linkage.

6. The system of claim 5 wherein said conduit comprises a friction assembly channel, and wherein said friction pad moves linearly within said friction assembly channel in response to actuation of said actuator.

7. The system of claim 5 wherein said friction pad comprises at least one of non-metallic materials, semi-metallic materials, fully metallic materials, and ceramic materials.

8. The system of claim 2 wherein positions of said electromechanical actuator and said conduit are fixed relative to each other.

9. The system of claim 2 wherein said linkage comprises a first contact surface and a laterally opposed second contact surface, and wherein said caliper selectively contacts said first contact surface and said second contact surface.

10. The system of claim 2 wherein said resistive force is variable based on a pressure applied to linkage by said caliper.

11. The system of claim 2 wherein said conduit comprises a linkage channel, and wherein said linkage moves linearly within said linkage channel in response to actuation of said electromechanical actuator.

12. An apparatus comprising:
a linkage comprising a longitudinal axis, a first end configured to be mechanically coupled to an electromechanical actuator, and a longitudinally opposed second end configured to be mechanically coupled to a load;
a caliper to apply a resistive force to said linkage; and
a conduit, said linkage being linearly movable through said conduit in response to linear movement of said electromechanical actuator.

13. The apparatus of claim 12 wherein said resistive force applied to said linkage simulates a mechanical problem within said electromechanical actuator.

14. The apparatus of claim 12 wherein said caliper comprises a laterally opposed pair of friction assemblies, and wherein each one of said pair of friction assemblies selectively engages said linkage to apply said resistive force.

15. The apparatus of claim 14 wherein each one of said pair of friction assemblies comprises a friction pad and an actuator coupled to said friction pad, and wherein said actuator selectively moves said friction pad between a first position not in contact with said linkage and a second position in contact with said linkage.

16. The system of claim 15 wherein said conduit comprises a linkage channel, and wherein said linkage moves linearly within said linkage channel in response to actuation of said electromechanical actuator.

17. The system of claim 16 wherein said conduit further comprises a friction assembly channel intersecting said linkage channel, and wherein said friction pad moves linearly within said friction assembly channel in response to actuation of said actuator.

18. A method comprising:
positioning a linkage through a linkage channel of a conduit;
coupling a first end of said linkage to an output of an electromechanical actuator;
coupling a second end of said linkage to a load;
applying a resistive force to said linkage by a caliper;
actuating linear motion of said output of said electromechanical actuator; and
resisting linear movement of said linkage with said resistive force applied by said caliper to alter an output response of said electromechanical actuator.

19. The method of claim 18 further comprising:
transmitting a command signal to said electromechanical actuator to actuate linear motion of said output of said electromechanical actuator;
transmitting said command signal to a fault detection system;
sensing said output response by said fault detection system; and
verifying whether said output response is identified as a failure response by said fault detection system.

20. The method of claim 19 further comprising setting a threshold limit based on said failure response.

* * * * *